US011368524B1

(12) United States Patent
Musumeci et al.

(10) Patent No.: US 11,368,524 B1
(45) Date of Patent: Jun. 21, 2022

(54) SYSTEMS AND METHODS FOR RATE-BASED LOAD BALANCING

(71) Applicant: META PLATFORMS, INC., Menlo Park, CA (US)

(72) Inventors: Gian-Paolo Primo Musumeci, Orinda, CA (US); Cong Chen, Belmont, CA (US); Kestutis Patiejunas, Sammamish, WA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

(21) Appl. No.: 16/547,123

(22) Filed: Aug. 21, 2019

(51) Int. Cl.
*H04L 67/1008* (2022.01)
*H04L 67/62* (2022.01)
(Continued)

(52) U.S. Cl.
CPC .......... *H04L 67/1008* (2013.01); *H04L 41/16* (2013.01); *H04L 47/215* (2013.01); *H04L 67/101* (2013.01); *H04L 67/325* (2013.01)

(58) Field of Classification Search
CPC ............. H04L 67/1002; H04L 67/1008; H04L 67/101; H04L 67/02; H04L 67/1029; H04L 69/329; H04L 47/125; H04L 67/1095; H04L 61/1511; H04L 67/1023; H04L 67/1012; H04L 67/2814; H04L 67/306; H04L 29/12066; H04L 63/08; H04L 45/00; H04L 47/10; H04L 63/1458; H04L 67/16; H04L 67/22; H04L 29/06027; H04L 45/60; H04L 45/745; H04L 45/7457; H04L 47/11; H04L 47/20; H04L 49/205; H04L 49/3009; H04L 49/3036; H04L 49/3072; H04L 63/0227; H04L 65/607; H04L 67/06; H04L 67/1027; H04L 67/142; H04L 67/2823; H04L 69/22; H04L 29/12113; H04L 61/1541; H04L 67/10; H04L 67/2847; H04L 67/327; H04L 12/14; H04L 29/06; H04L 41/509; H04L 43/00; H04L 63/102; H04L 65/4084; H04L 65/602; H04L 67/1031; H04L 67/1034; H04L 67/34; H04L 41/0896; H04L 43/0876; H04L 47/726; H04L 61/1523; H04L 65/1063; (Continued)

(56) References Cited

U.S. PATENT DOCUMENTS

2003/0126200 A1* 7/2003 Wolff ........................ G06F 9/52
709/203
2005/0228884 A1* 10/2005 Hawley ............... H04L 67/1002
709/225

(Continued)

*Primary Examiner* — Djenane M Bayard
(74) *Attorney, Agent, or Firm* — Mannava & Kang, P.C.

(57) ABSTRACT

According to examples, a system for rate-based load balancing may include a processor and a memory storing instructions. The processor may, through execution of the instructions, cause the system to receive a request for processing. The system may further identify a target server to transmit the request using a rate-based load balancing technique. In some examples, the rate-based load balancing technique may include: selecting a server, from a plurality of servers, as a potential target; receiving a readiness indicator for the selected server; and designating the selected server as the target server based on the readiness indicator. The system may transmit the request to the target server for processing.

18 Claims, 10 Drawing Sheets

(51) Int. Cl.
*H04L 47/215* (2022.01)
*H04L 41/16* (2022.01)
*H04L 67/101* (2022.01)

(58) Field of Classification Search
CPC ..... H04L 65/60; H04L 67/2842; H04L 69/08; H04L 41/16; H04L 67/325; H04L 47/215; H04L 43/04; H04L 43/087; H04L 43/10; H04L 43/12; H04L 47/22; H04L 47/525; H04L 47/528; H04L 47/6265; H04L 47/783; H04L 41/046; H04L 41/5025; H04L 41/5096; H04L 43/02; H04L 43/026; H04L 43/0858; H04L 43/0864; H04L 43/0882; H04L 43/106; H04L 43/16; H04L 45/38; H04L 47/115; H04L 47/225; H04L 47/2433; H04L 47/6255; H04L 47/6275; H04L 47/76; H04L 12/1877; H04L 12/2825; H04L 12/5602; H04L 2012/40215; H04L 2012/40273; H04L 2012/5614; H04L 2012/5619; H04L 2012/563; H04L 2012/5632; H04L 2012/5635; H04L 2012/5638; H04L 2012/5652; H04L 41/0266; H04L 41/0604; H04L 41/0681; H04L 41/0686; H04L 41/069; H04L 41/0803; H04L 41/5003; H04L 61/2007; H04L 61/6022; H04L 63/1416; H04L 67/125; H04L 67/14
See application file for complete search history.

(56) References Cited

U.S. PATENT DOCUMENTS

| | | | |
|---|---|---|---|
| 2007/0147422 A1* | 6/2007 | Urano | H04L 47/215 370/468 |
| 2014/0122725 A1* | 5/2014 | Batrouni | H04L 67/2842 709/226 |
| 2016/0321588 A1* | 11/2016 | Das | G06F 11/3442 |
| 2016/0328159 A1* | 11/2016 | Coddington | H04L 43/026 |
| 2017/0171089 A1* | 6/2017 | Agarwal | H04L 47/6275 |
| 2020/0028788 A1* | 1/2020 | Chen | H04L 49/90 |

* cited by examiner

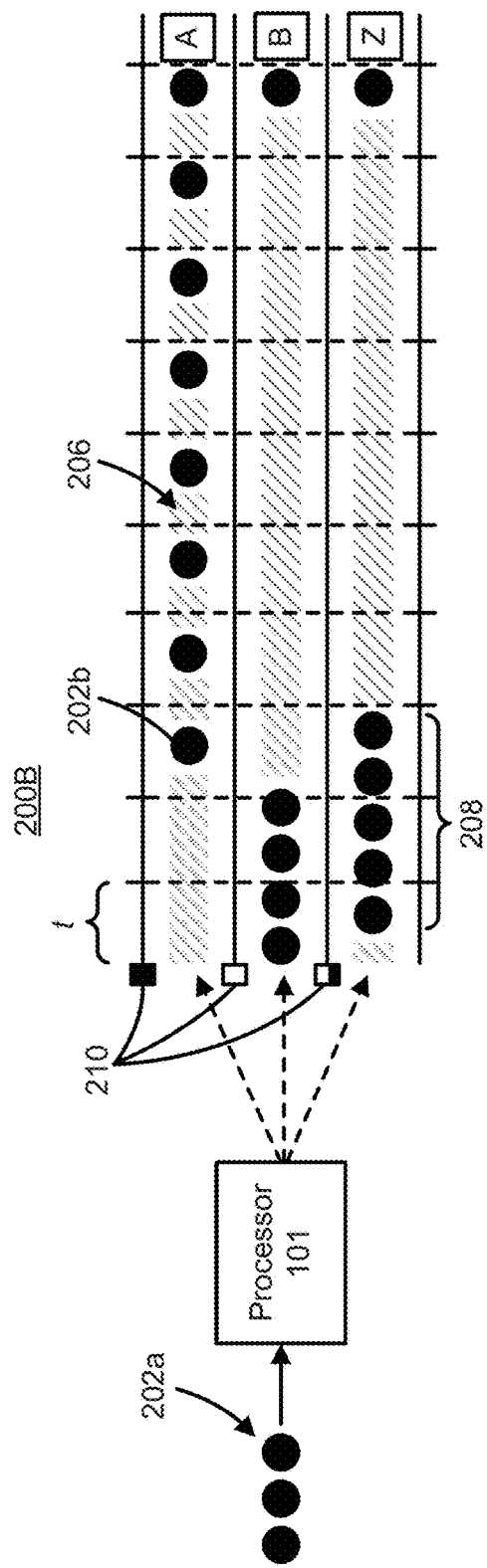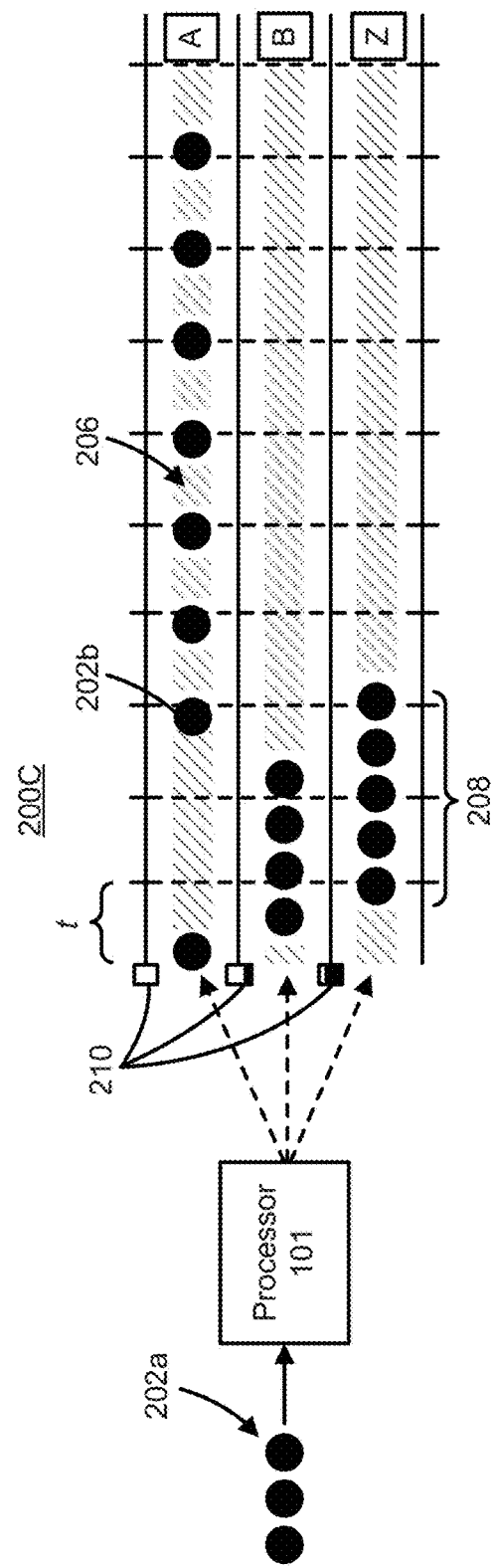

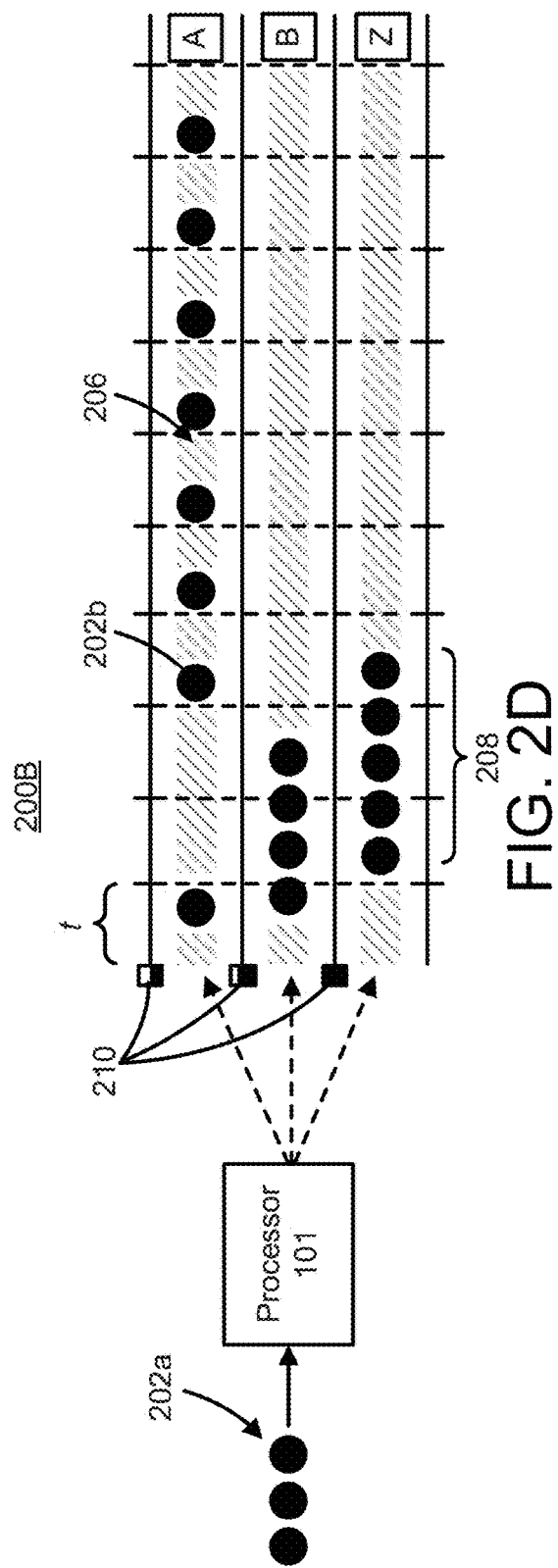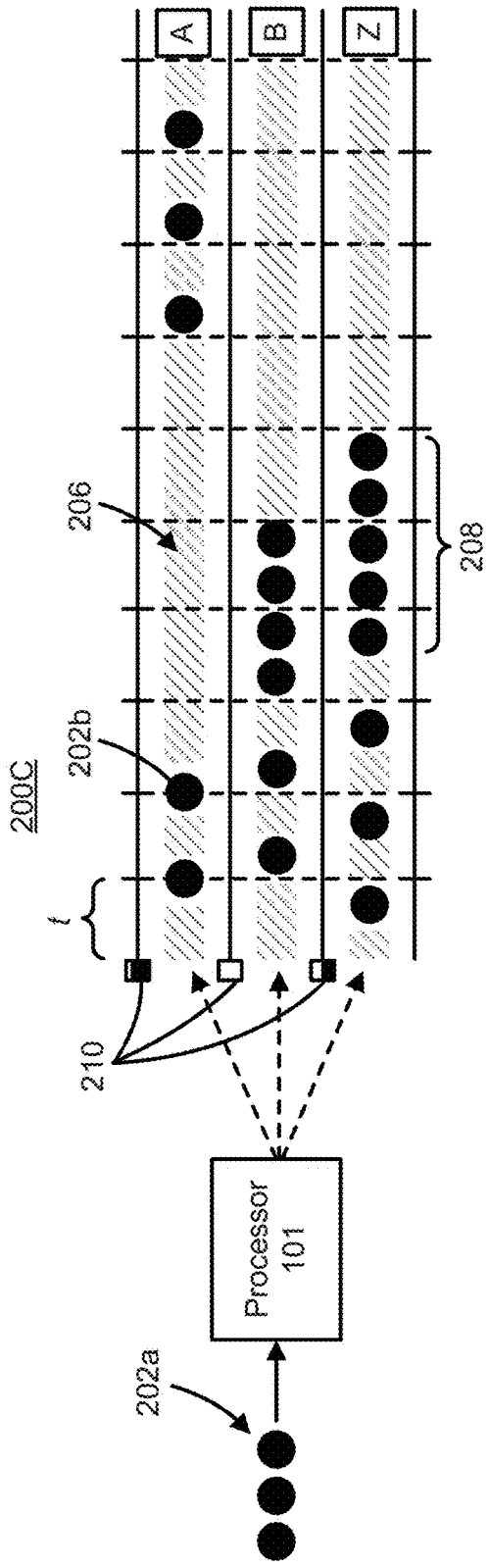

SYSTEMS AND METHODS FOR RATE-BASED LOAD BALANCING

TECHNICAL FIELD

This patent application relates generally to load-balancing systems, and more specifically, to systems and methods for rate-based load balancing.

BACKGROUND

Load balancing is a technique that helps improve distribution of workloads across multiple resources. In a computing environment, these workloads may include requests that computing resources, such as servers, are to process. Load balancing aims to optimize resource usage, maximize output, minimize response time, and avoid overloading any particular resource or group of resources. Any inefficient distribution of workload or misallocation of resources may create workload congestion that results in a backlog, all of which may be disruptive in high volume data traffic environments.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIGS. 2A-2E illustrates data workflow of requests in a system of FIG. 1 for rate-based load balancing, according to an example.

DETAILED DESCRIPTION

Figure 1A:
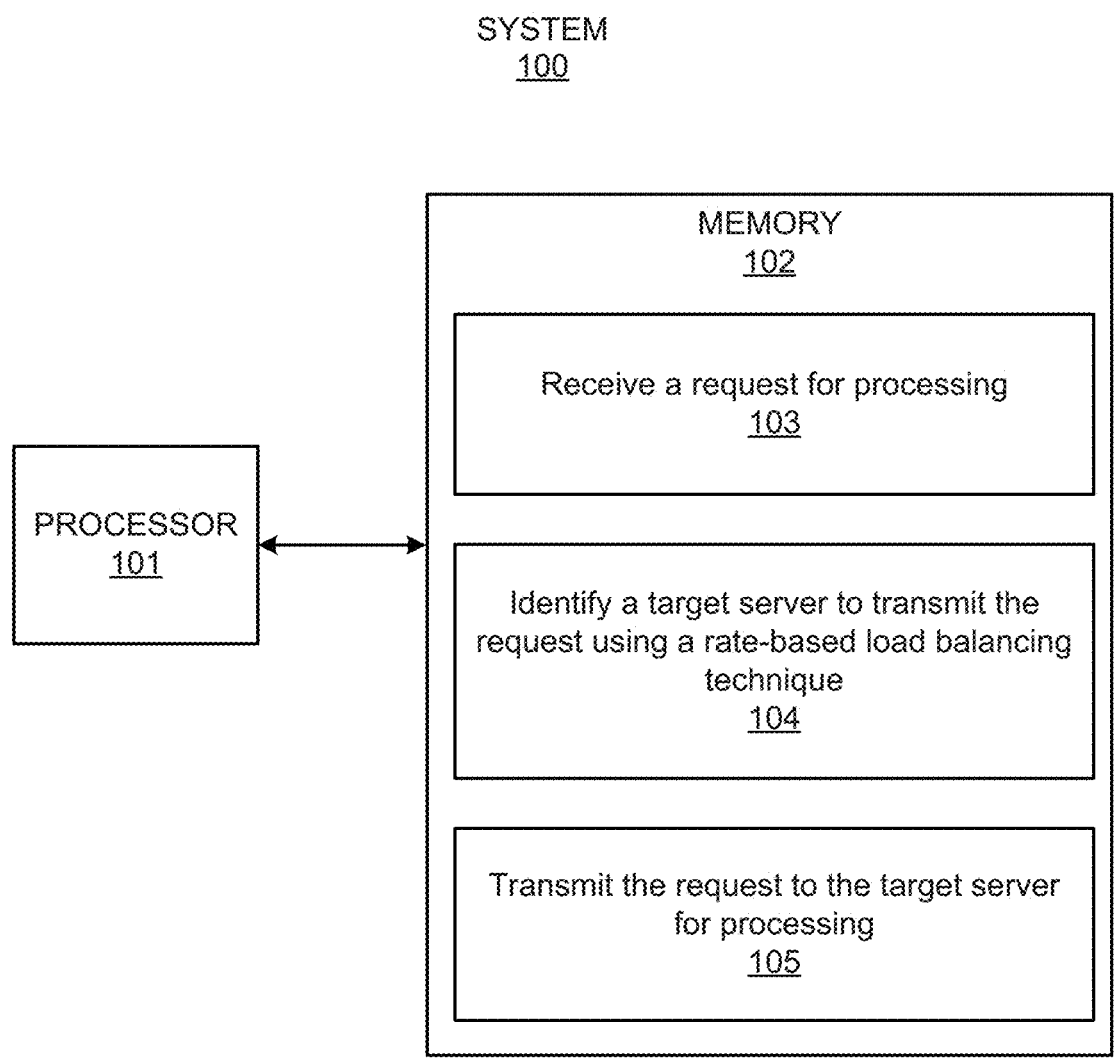
FIG. 1A illustrates a block diagram of a system for rate-based load balancing, according to an example.

For simplicity and illustrative purposes, the present disclosure is described by referring mainly to examples thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Load balancing refers to the process of efficiently distributing incoming workload among a group of resources. In a distributed computing environment, for example, the incoming workload may include a large number of requests that these resources, such as servers or other computing devices, may process. A load balancing system may distribute the large number of requests among the various resources and spread the workload in such a way that avoids overloading any particular resource. In this way, each resource from the group of resources may receive a workload that suits its processing capabilities, thereby optimizing overall resource usage, maximizing output, and minimizing system response time.

Load balancing systems may rely on a variety of scheduling techniques to determine which particular resource, e.g., server, should receive any given incoming request. Most scheduling techniques employ some form of metric-based approach that may rely on server utilization or other metric, which may include computer processing unit (CPU) utilization, network utilization, number of open connections, etc. In such systems, a load balancer may route an incoming request to a server (from among a group of available servers (e.g., a server farm)) that has adequate or available processing capabilities. In other words, knowledge of each server's current workload (e.g., utilization) and/or processing capability may help a load balancing system decide where to send each new incoming request and/or how to allocate resources to optimize processing output. In order for a metric-based load balancer to know which servers have processing capabilities to handle new incoming requests, the metric-based load balancer may use a scheduling technique that asks for and receives from each server information about its processing capabilities. In some examples, this information about processing capabilities may be a value associated with a load balancing metric.

A technical issue in metric-based load balancing may involve a delay in the time it takes between when information associated with a server's processing capabilities is received and when a request is ultimately assigned out by the load balancer to a particular server. Although this delay may be relatively small, by the time information associated with the server's processing capabilities is received by the load balancer, this information may already be outdated. It may also take additional time for the load balancer to process that information to make an informed decision and decide which server to send the next incoming request. Depending on a metric used, there may be even more delay. This added delay may render the already "out-of-date" information even more so. Furthermore, the process of asking for and receiving information from the servers about their processing capabilities is not instantaneous, and may require additional processing time. All together, these delays may add up and create a situation where the high volume of requests is transmitted to servers that may or may not have processing capabilities to handle these requests. As a result, these requests may not be efficiently load balanced across the servers.

Another technical issue with metric-based load balancing is that requests may arrive at servers from load balancers according to a Poisson process. The Poisson process may refer to a model for a series of discrete events where the average time between events is known, but the exact timing of events is random. In other words, a metric-based load balancer may distribute incoming requests to servers that the load balancer believes to have the requisite processing capability to process requests. However, if a particular server has exceptional processing capability (e.g., low utilization) to handle requests, for example, these incoming requests may be transmitted in such rapid succession, according to a Poisson process, that creates a tightly-packed or "bunched up" grouping of requests. In effect, the server that initially had high processing capabilities may be so overburdened by this tightly-packed grouping of requests that the performance of the server may severely be diminished.

Because a load balancer may serve hundreds of thousands, if not millions, of concurrent requests from any number of data sources, a load balancing system may be needed to help overcome the shortcomings of metric-based approaches. According to examples described herein, a rate-based approach for load balancing may be provided. Rather than relying strictly on knowledge of the processing capabilities of servers, the approaches described herein may incorporate scheduling techniques that may rely on timing factors. These timing factors may be provided, for example, by rate controllers to help determine when requests were last transmitted to the servers. Only after a certain passage of time since the last transmission of a request to any particular server may it be made available to receive a new request. In other words, the rate-based techniques described herein may focus more on a coordinated and interspersed distribution of requests to servers based on a timing factor (e.g., last time the servers received a request), rather than on the utilization or processing capabilities of the servers.

The rate-based load balancing approaches disclosed herein may reduce undue congestion and backlog, as well as minimize probability that requests to any particular server will be tightly-packed in time. Using a rate-based approach may provide a more efficient and energy-conserving way to schedule request delivery and manage resources. Furthermore, the rate-based load balancing approaches disclosed herein may increase scalability, reduce downtime, increase performance, reduce management resource failure, and maximize flexibility. The rate-based load balancing techniques described herein may be particularly advantageous for advertising, online shopping, or other scenarios where real-time or near real-time transaction processing may be desired. These and other benefits will be apparent in the description provided herein.

Figure 1B:
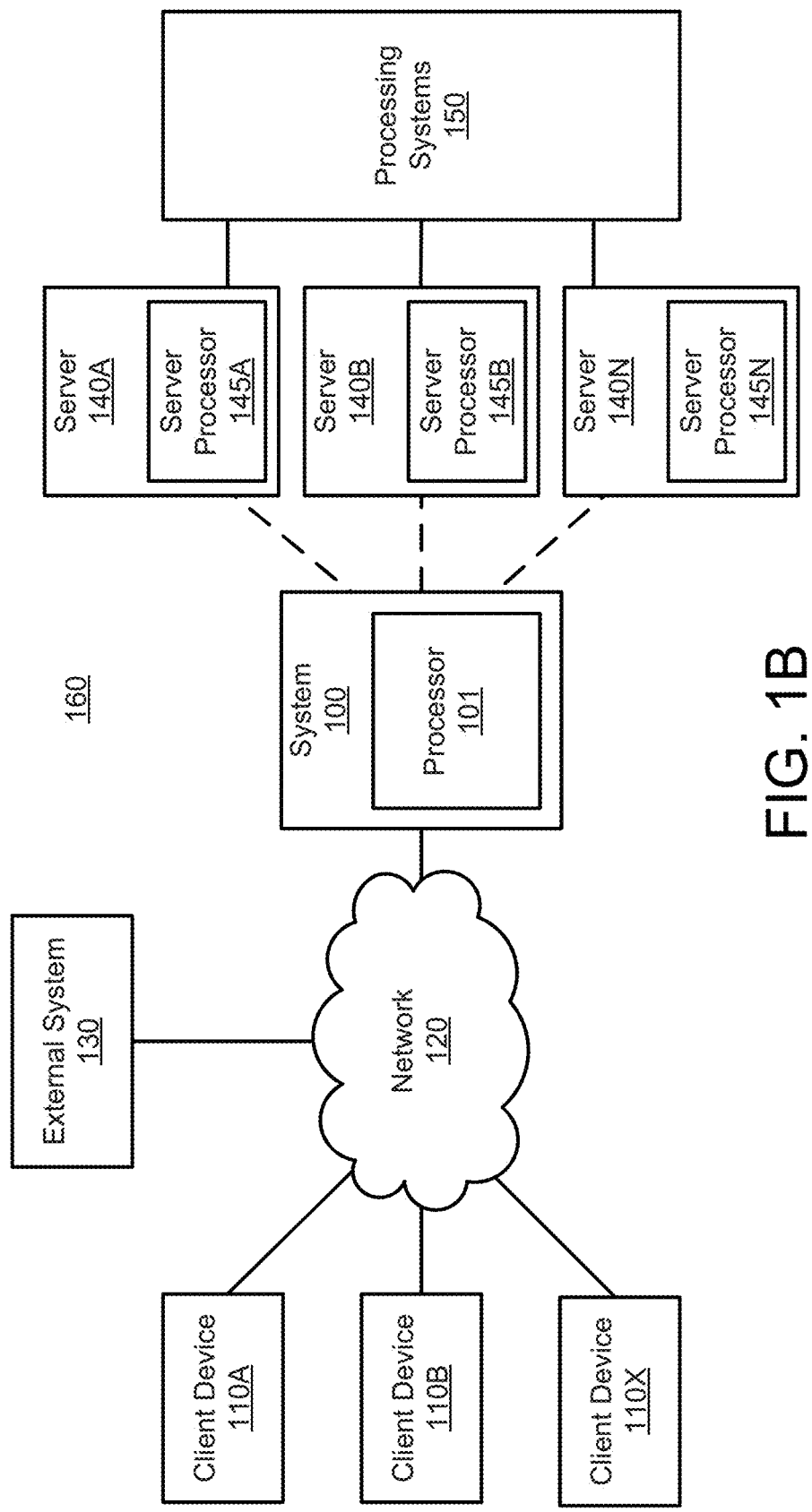
FIG. 1B illustrates a block diagram of a system environment of a system for rate-based load balancing, according to an example.

Reference is first made to FIGS. 1A and 1B. FIG. 1A illustrates a block diagram of a system 100 that may provide rate-based load balancing, according to an example. FIG. 1B illustrates a block diagram of a system environment 160 in which the system 100 may be implemented to provide rate-based load balancing, according to an example. It should be appreciated that the system 100 depicted in FIG. 1A and/or the system environment 160 depicted in FIG. 1B may be exemplary illustrations. Thus, the system 100 and/or the system environment 160 may or not include additional features and some of the features described herein may be removed and/or modified without departing from the scopes of the system 100 and/or the system environment 160 outlined herein.

As shown in FIG. 1B, the system environment 160 may include any number of client devices 110, shown as client devices 110A, 110B, and 110X, in which the variable "X" may represent an integer greater than one. The system environment 160 may also include a network 120, an external system 130, and any number of servers 140, shown as servers 140A, 140B, and 140N, in which the variable "N" may represent an integer greater than one. It should be appreciated that each of the servers 140 may include respective server processors 145, shown as server processors 145A, 145B, and 145N.

In operation, the system 100 may receive a plurality requests from the client devices 110 (or other network elements via the network 120) and load balance these requests among the servers 140 for processing at the server processors 145. The servers 140 may also be communicatively coupled to processing systems 150, which may provide additional downstream processing. In some examples, the system 100 may be a social networking system, a content sharing network, an advertisement system, an online system, an electronic payment system, and/or any other system that facilitates any variety of data processing in personal, social, commercial, financial, and/or enterprise environments.

In some examples, the system 100 may include a processor 101 and a memory 102, as shown in FIG. 1A. The memory 102 may store instructions, which when executed by the processor 101, may cause the processor to receive a request for processing (103), identify a target server to transmit the request using a rate-based load balancing technique (104), and transmit the request to the target server for processing (105). As described in more detail below, identifying a target server may further involve: selecting a server, from a plurality of servers, as a potential target; receiving a readiness indicator for the selected server; and designating the selected server as the target server based on the readiness indicator. Accordingly, the system 100 may use the rate-based load balancing to select and route requests to the servers 140 for the server processors 145 to process. In some examples, the rate-based load balancing load balancing technique may involve any number of scheduling techniques and may or may not incorporate an artificial intelligence (AI) based machine learning technique as well. Details of the system 100 and its operation within the system environment 160 will be described in more detail below.

It should be appreciated that the processor 101 may be a semiconductor-based microprocessor, a central processing unit (CPU), an application specific integrated circuit (ASIC), a field-programmable gate array (FPGA), and/or other suitable hardware device. In some examples, the memory 102 may have stored thereon machine readable instructions 103-105 (which may also be termed computer-readable instructions) that the processor 102 may execute. The memory 102 may be an electronic, magnetic, optical, or other physical storage device that contains or stores executable instructions. The memory 102 may be, for example, Random Access memory (RAM), an Electrically Erasable Programmable Read-Only Memory (EEPROM), a storage device, an optical disc, and the like. The memory 102, which may also be referred to as a computer readable storage medium, may be a non-transitory machine-readable storage medium, where the term "non-transitory" does not encompass transitory propagating signals.

Each of the client devices 110 may be a computing device that may transmit and/or receive data via the network 120. In this regard, each of the client devices 110 may be any device having computer functionality, such as a smartphone, a tablet, a laptop, a watch, a desktop, a server, or other computing device. Each of the client devices 110 may be a source for any number of requests for processing by the servers 140. It should be appreciated that a request, as described herein, may refer to any type of data or network traffic. This may include, for example, a request for an electronic or online transaction, a payment transaction, an advertisement transaction, etc.

In some examples, the client devices 110 may execute an application allowing a user of the client devices 110 to interact with various elements on the network 120. For instance, the client devices 110 may receive data from user input, a database, a file, a web service, and/or via an application programming interface (API). Additionally, the client devices 110 may execute a browser or application to enable interaction between the client devices 110 and the system 100 via the network 120. For example, a user may interact with a mobile application or a web application, executing via a browser, to provide user input. In an example, the client devices 110 may interact with the system 100 through application programming interfaces (APIs) running on a native or remote operating systems of the client devices 110. Other various examples may also be provided.

According to some examples, the client devices 110 may also include hardware or software for load balancing related features. For instance, the client devices 110 may have access to or include data associated with the processor 101. As shown, one or more portions of the system 100 and the processor 101 may reside at a network-centric location. However, it should be appreciated that any data or functionality associated with the processor 101 may also be local to the client devices 110, or at some other computing device between the client devices 110 and the servers 140, to facilitate load balancing functionality by the system 100.

The network 120 may be a local area network (LAN), wide area network (WAN), the Internet, a cellular network, a cable network, a satellite network, or other network that facilitates communication between the client devices 110, the external system 130, the system 100, and/or any other system, component, or device connected to the network 120. The network 120 may further include one, or any number, of the exemplary types of networks mentioned above operating as a stand-alone network or in cooperation with each other. For example, the network 120 may utilize one or more protocols of one or more clients or servers to which they are communicatively coupled. The network 120 may facilitate transmission of data according to a transmission protocol of any of the devices and/or systems in the network 120. Although the network 120 is depicted as a single network in FIG. 1, it should be appreciated that in some examples, the network 120 may include a plurality of interconnected networks as well.

The external system 130 may be communicatively coupled to the network 120. In some examples, the external system 130 may be a third-party website, or any content or data source, that provides content or data to the client devices 110 and/or the system 100. For example, the external system 130 or other network element (not shown) may also be a source of requests for load balancing by the system 100.

In some examples, the external system 130 may include an enterprise resource planning (ERP) system and application, a document, a web feed or online portal. The ERP system may include one or more application servers that host various ERP applications. These may include, for example, a customer relationship management (CRM) platform, system, or application. The ERP system may collect, store, manage, and interpret data associated with various enterprise functions or activities. The ERP system may also provide an integrated and continuously updated view of core business processes, for example, using common databases maintained by a database management system. The ERP system may also track enterprise resources (e.g., cash, digital content, production capacity, etc.) as well as other information, such as corporate or business transactions (e.g., orders, payroll, etc.). The ERP system may also monitor and store data associated with various customer communications. Furthermore, the applications that make up the ERP system may share data across various departments (e.g., manufacturing, purchasing, sales, accounting, etc.) that provide related communications data. The ERP system may facilitate information flow between many enterprise functions and may manage communications with stakeholders, customers, or other parties. The ERP system may also contain a large amount of information that could be used to enhance meaning of other data. In some examples, the external system 130 may include any number of customer or user profiles, preferences, trends, policies, etc., all of which may facilitate successful load balancing and/or request processing, as described herein.

Each of the servers 140A, 140B, and 140N may have request processing capabilities. In some examples, the servers 140 may also transmit requests or related data to processing systems 150. Each of the servers 140A, 140B, and 140N may be similar or different from each other with respect to hardware/software specifications and processing capabilities. However, each of the servers 140A, 140B, and 140N may play a role in processing any number of requests received from the system 100. In other words, the servers 140 may process requests received from the system 100 and may do so in an efficient and coordinated fashion, as instructed by the system 100 via a rate-based load balancing techniques described herein.

Each of the servers 140A, 140B, and 140N may include server processors 145, shown as server processors 145A, 145B, and 145N, that is associated with each of the servers 140A, 140B, and 140N. In some examples, these server processors 145 may be referred to as index processors. Each of the server processors 145A, 145B, and 145N may have a processing capabilities, which may be measured by computer processing unit (CPU) utilization. In some examples, workload or CPU utilization may be inversely proportional to processing capability or availability. It should be appreciated that the terms, CPU "utilization" and "processing capabilities" may be used similarly or interchangeably to describe availability of a resource, such as a server or other computing device.

The server processors 145 may facilitate the processing of requests and/or transmit the requests to downstream transaction processing systems 150. As described herein, the system 100, via the processor 101, may use a rate-based load balancing technique to route incoming requests (e.g., from the client devices 110, external system 130, or other network element) across the servers 140, in accordance with one or more rate-based approaches.

Unlike a metric-based load balancing regime, the system 100 may route requests to any one of the servers 140 based on a rate-based approach. Rather than communicating with each server 140A, 140B, and 140N to determine its CPU utilization or processing capabilities, the system 100 may employ a rate-based load balancing technique, as depicted in FIGS. 1A and 1B. In some examples, the rate-based load balancing technique may employ a rate controller to determine when a request was last transmitted to a particular server 140A, 140B, and 140N. The rate-based load balancing technique may recognize that even though a particular server, say the server 140A, may have the greatest processing availability (relative to all the other servers 140) to handle new requests, it may not be prudent to transmit the next requests to that server 140A.

As mentioned above, information associated with the processing capabilities of the server 140A received at the processor 101 may take time, and may therefore be outdated by the time the next batch of requests (e.g., five (5) requests) becomes ready to be transmitted to that server 140A. Moreover, sending the five (5) requests in rapid succession to the server 140A may cause the requests to be "bunched up" in time, which may or may not be in accordance with a Poisson process, as described above. Either way, employing a rate-based approach may obviate these problems by monitoring the "capabilities" of each server 140A, 140B, or 140N based on when the last request was submitted rather than on its CPU utilization or processing capabilities. In other words, these "capabilities" may be based on rates at which requests may be processed by each server 140A, 140B, or 140N, rather than a direct capability, such as CPU utilization, etc. Details with regard to these rate-based techniques will be apparent in the description of FIGS. 2A-2E and FIG. 3 below.

It should be appreciated that FIG. 1B shows the network 120 communicatively coupled to the client devices 110, the external system 130, and the system 100. However, it should be apparent to one of ordinary skill in the art that the network 120 may also communicatively couple the system 100, the servers 140, the transaction processing systems 150, and/or any other computing device or network element in the system environment 160. In some examples, the processor 101 may incorporate other instructions or data to the rate-based load balancing approach. For instance, the system 100 may also receive data or various instructions from the client devices 110, the external system 130, and/or other network element (not shown) via the network 120, to help with the rate-based load balancing approaches described herein. In some examples, the data or instructions received may help the system 100 determine how long any particular request may take to process at any of the servers 140, and may therefore help the processor 101 configure various timing factors associated with the rate controllers to optimize the allocation of resources during the process of rate-based load balancing. This may also provide a more customizable and tailored experience for various types of requests and their respective processing demands.

FIGS. 2A-2E illustrate data workflows 200A-200E of requests for rate-based load balancing, according to an example. Although FIGS. 2A-2E are directed to an online computing environment, it will be apparent to one of ordinary skill in the art that the principles described may be applied to other environments, such as distributed computing, payments, advertisements, manufacturing, etc.

Figure 2A:
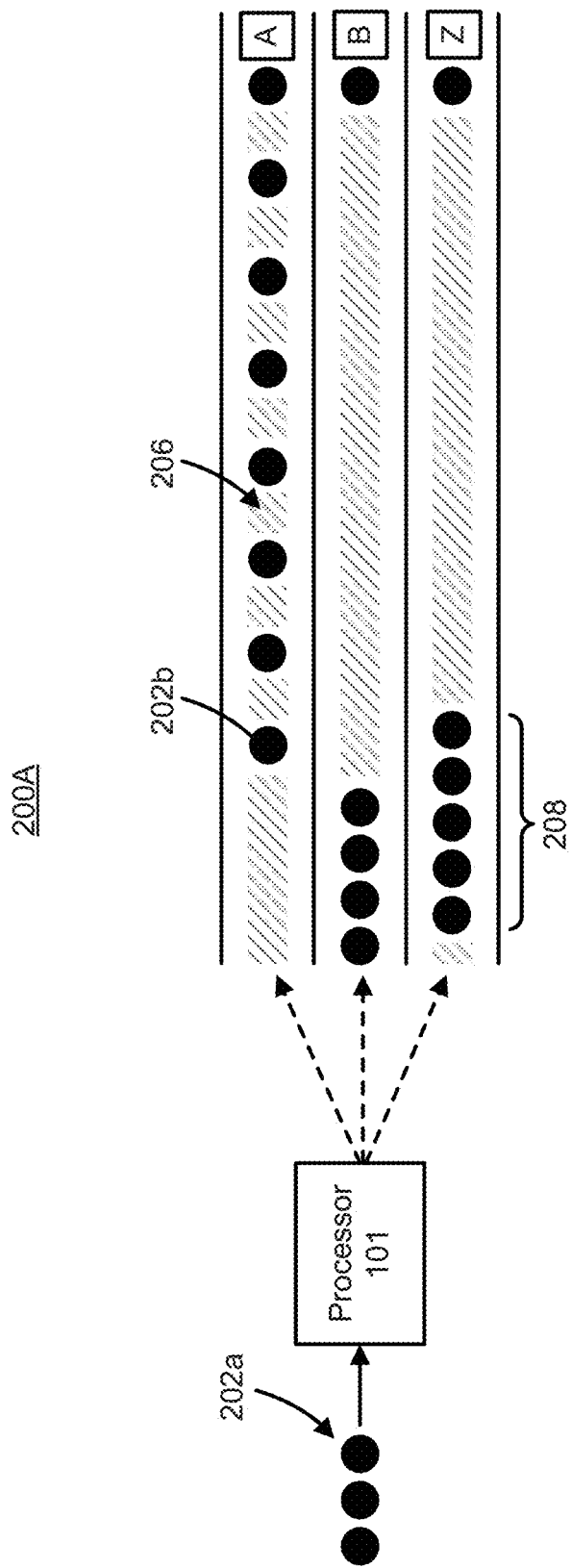

FIG. 2A illustrates a data workflow 200A for rate-based load balancing, according to an example. As shown, a processor 101 may receive a plurality of incoming requests 202a. In some examples, the processor 101 may be the processor 101 for system 100 shown in FIGS. 1A and 1B. In some examples, these incoming requests 202a may originate from the client devices 110, external system 130, and/or any other network element (not shown) communicatively coupled to the processor 101 via the network 120 of FIG. 1, as described above. The data workflow 200A, as shown, may illustrate As the processor 101 receives new incoming requests 202a, the processor 101 may load balance these incoming requests 202a across any number of servers 140 (and their respective server processors 145) for processing via one or more processing lanes A, B, and Z, in which the variable "Z" may represent an integer greater than one. In some examples, the servers 140 and server processors 145 may be servers 140 and server processors 145 in system environment 160 shown in FIG. 1B. As shown in the data workflow 200A, each of the processing lanes A, B, and Z may include a series of queued requests 202b. It should be appreciated that each processing lane A, B, and Z may have a receiving end and a processing end. The receiving end may receive requests 202a from the processor 101 and the processing end may include a queued request 202b ready for processing at the server 140. Each of the processing lanes A, B, and Z may also include one or more gaps 206 between some of the queued requests 202b. For purposes of pictorial depiction, each of these processing lanes A, B, and Z may illustrate how queued requests 202b traverse along each processing lane A, B, or Z in an order they were submitted for processing at the servers 140.

The differences between queued requests 202a in their respective processing lanes A, B, and Z should be noted. For example, the processing lane A may include eight (8) queued requests 202b. However, these eight (8) queued requests 202b may be evenly interspersed along the processing lane A, with a gap 206 between each of the eight (8) queued requests 202b. The processing lane A may also include a gap 206 at the receiving end, indicating that it has not received a new incoming request 202a for the duration of that gap 206. The processing lane B may include five (5) queued requests 202b. However, the processing lane B may have four (4) queued requests 202b in a tightly-packed grouping 208 at the receiving end of the processing lane B. The processing lane Z may include six (6) queued requests 202b. Similar to the processing lane B, the processing lane Z may also have a tightly-packed grouping 208 of five (5) queued requests 202b at the receiving end of the processing lane B. But unlike the processing lane B, the processing lane Z may include a gap 206 at the receiving end of the processing lane Z, indicating that the most recent queued request 202b of the processing lane Z is older than the most recently queued request 202b of the processing lane B. Each of the processing lanes A, B, and Z may have a queued request 202b at the processing end ready for processing.

It should be appreciated that the queued requests 202b, as shown in the data workflow 200A, may not yet have been load balanced using a rate-based load balancing technique. The effects of the rate-based load balancing technique, as it is implemented and applied, will become apparent in the description of FIGS. 2A-2E herein.

FIG. 2B illustrates a data workflow 200B in a system 100 for rate-based load balancing, according to an example. Although similar to data workflow 200A of FIG. 2A, the data workflow 200B of FIG. 2B may further include rate controllers 210 for each of the processing lanes A, B, and Z. In some examples, the rate controllers 210 may provide one or more readiness indicators to indicate whether a certain amount of time t has passed since the last incoming request 202a was inserted to the processing lane A, B, or Z. If at least t amount of time has passed, the rate controllers 210 may indicate that it is ready to receive the next incoming request 202a from the processor 101. As shown in data workflow 200B, each processing lane A, B, and Z may be divided by ten (10) increments of t. It should be appreciated that t may represent any duration of time, and there may be any number of increments of t in any of the processing lanes A, B, or Z. In an example, the rate controllers 210 configured with a rate of 100 requests per second may be able receive an incoming request 202a every $1/100^{th}$ of a second.

As shown in FIG. 2B, the rate controllers 210 may be shown to provide a pictorial depiction of whether time t has passed since the last queued request 202b to signal whether the processing lanes A, B, or Z are able to receive new requests 202a. For example, the rate controller 210 at the processing lane A may present a "full" indicator (all black) to show that time t has passed and that the processing lane A is ready to accept new requests 202a. The rate controller 210 at the processing lane B, however, may present an "empty" indicator (all white) to show that no time has passed since receive its last request 202a, and therefore, the processing lane B is not currently able to receive a new request 202a under a rate-based load balancing approach. The rate controller 210 at the processing lane Z may present an indicator that is "partially full" (partially shaded) to indicate that some time has passed since receiving its last request 202a but that time is current less than t. Accordingly, the processing lane Z, like the processing lane B, may be currently unable to receive a new request 202a. That said, it should be appreciated that the processing lane Z may meet the time t before the processing lane B as the queued requests 202b for all the processing lanes A, B, and Z continue to progress along.

In various computing environments, it should be appreciated that the rate controller 210 may be employ a variety of timing techniques. In some examples, the timing technique may involve use of a token bucket. A token bucket may be an algorithm that may provide a fixed-capacity "bucket" into which tokens, typically represented by units of bytes or a packet of predetermined size, are added into the bucket at a predetermined fixed rate. To put another way, a token may be added to the bucket every 1/r seconds (or other time unit), and the bucket may be predetermined to hold no more than b tokens. Thus, if a token arrives when the bucket is full, the token will be discarded, and the bucket will remain full. In a rate-based load balancing system, the bucket may remain full until an incoming request 202a is submitted to a processing lane A, B, or Z to which it is assigned. At that point, the bucket may be "emptied" and the algorithm may be reset. In this way, the rate controller 210 using the token bucket may provide a timing technique to indicate to the processor 101 which the processing lane A, B, or Z is available to receive the next incoming request 202a. Although examples described herein may employ a token bucket, it should be appreciated that other various timing techniques may also be provided.

Once the processor 101 determines from the rate controller 210 that only the processing lane A is available to receive incoming requests 202a, the processor 101 may transmit the next incoming request 202a to the processing lane A, as shown in FIG. 2C. Although similar to data workflow 200B of FIG. 2B, the data workflow 200C of FIG. 2C may illustrate changes in the rate controllers 210 and the queued requests 202b after a short passage of time since the data workflow 200B. For example, the rate controller 210 for the processing lane A may now present an "empty" indicator, and the rate controller 210 for the processing lane B may now present a "partially full" indicator. The rate controller 210 for the processing lane Z may also present a "partially full" indicator that is fuller than that of rate controller 210 of the processing lane B. As shown, none of the processing lanes A, B, or Z may be ready to receive new incoming requests 202a, according to the rate-based load balancing approach.

FIG. 2D illustrates a data workflow 200D in a system 100 for rate-based load balancing, according to an example. Although similar to data workflow 200C of FIG. 2C, the data workflow 200D of FIG. 2D may illustrate changes in the rate controllers 210 and the queued requests 202b after a short passage of time since the data workflow 200D. As shown, the rate controllers 210 for the processing lanes A and B may present a "partially full" indicator, whereas the rate controller 210 for the processing lane Z may present a "full" indicator. Thus, the processing lane Z may ready to receive a new incoming request 202a.

FIG. 2E illustrates a data workflow 200E in a system 100 for rate-based load balancing, according to an example. Although similar to data workflow 200D of FIG. 2D, the data workflow 200E of FIG. 2E may illustrate changes in the rate controllers 210 and the queued requests 202b after a short passage of time since the data workflow 200D. As shown, the processing lane Z received the last incoming request 202a. And now, the rate controller 210 of the processing lane B may present a "full" indicator, indicating it may be ready to receive the next incoming request 202a.

The rate-based load balancing approach as shown in FIGS. 2A-2E may not entirely rely on communication with the servers 140 to determine processing capabilities. Rather, the processor 101 may rely on the rate controllers 210 to distribute workload based on a timing technique, which in the examples described above, are based on a token bucket algorithm. In this way, the rate-based load balancing approach may not encounter the same or similar delays or tightly-packed "bunches" of request encountered in a strictly metric-based approach. For instance, the data workflow 200E, when compared to data workflow 202A, may illustrate requests that are more evenly distributed and dispersed among the processing lanes A, B, and Z. Thus, the system 100 described herein may obviate these shortcomings and provide an efficient way to load balance high volumes of data and requests.

Figure 3:
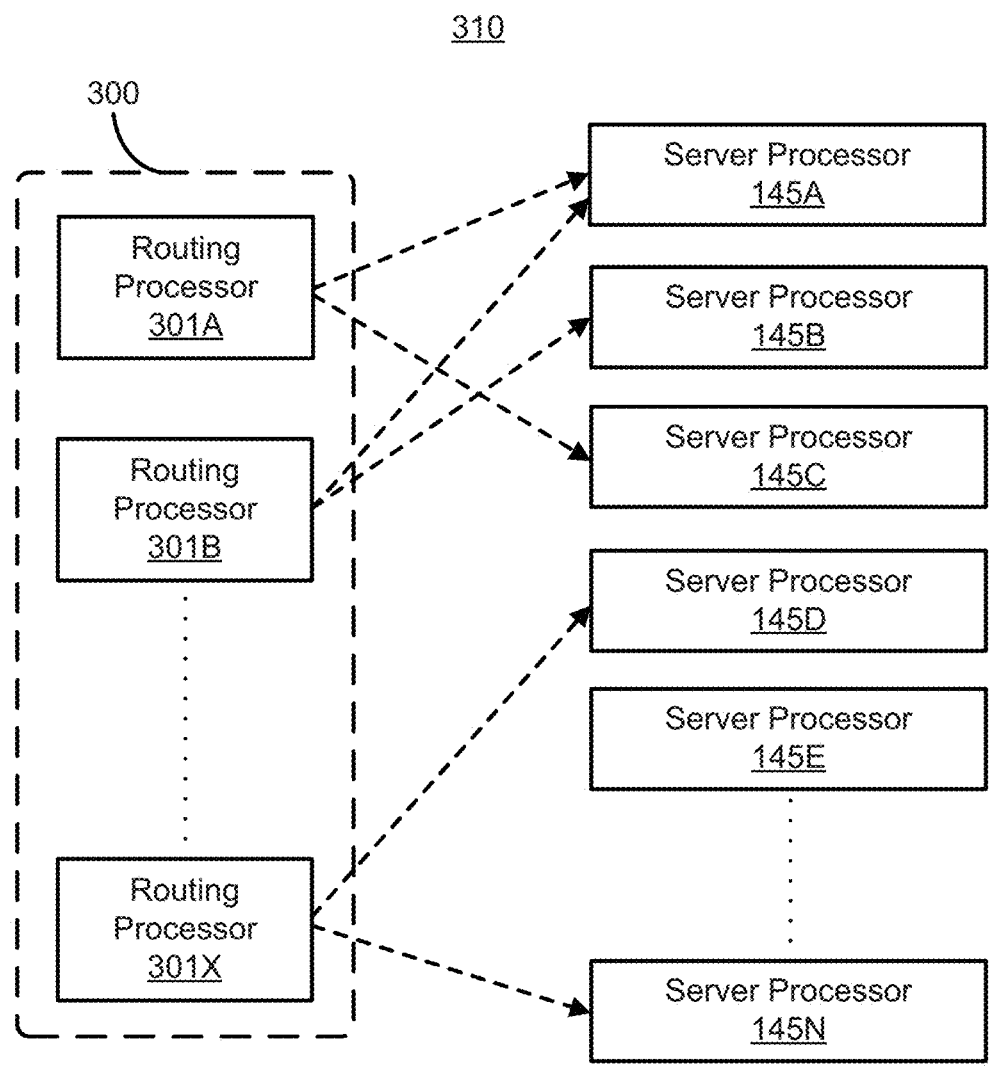
FIG. 3 illustrates a block diagram for rate-based load balancing using multiple routing processors, according to an example.

FIG. 3 illustrates a block diagram 310 for rate-based load balancing using multiple routing processors, according to an example. As shown there may be a system 300 that may include any number of routing processors 301, shown as routing processors 301A, 301B, and 301X, in which the variable "X" may represent an integer greater than one. In some examples, the system 300 and the routing processors 301A, 301B, and 301X may be part of the system 100 and processor 101 of FIGS. 1-2, as shown. Each of these routing processors 301A, 3011B, and 301X may be communicatively coupled to any number of server processors 145, shown as server processors 145A, 145B, 145C, 145D, 145E, and 145N, in which the variable "N" may represent an integer greater than one. In some examples, each of the server processors 145A, 145B, 145C, 145D, 145E, and 145N may correspond to server processors 145A, 145B . . . 145N, as shown in FIG. 1, where a workload of requests may be load balanced and processed.

In a computing or data processing environment, the routing processor 301A may receive a first request. In order to provide rate-based load balancing across the server processors 145, the routing processor 301A may initially select k processors to potentially send the first request, where k may represent integer greater than one. In an illustrative example where k is two (2), the routing processor 301A may randomly select server processor 145A and server processor 145C as potential targets to transmit the first request. Based on information received from rate controllers, as described above, the routing processor 301A may determine that the server processor 145A already has, for example, two (2) requests in its queue and that its token bucket is not "full." The routing processor 301A, however, may determine that server processor 145C has a token bucket that is "full" even though it may have three (3) requests in its queue. In a strict metric-based load balancing system, the routing processor 301A would immediate transmit the first request to server processor 145A since it has fewer requests, and therefore presumably more processing capabilities, relative to server processor 145C, which has three (3) requests in its queue.

In a rate-based load balancing approach, however, the routing processor 301A may transmit the first request based on whether the token bucket is "full" or not. Accordingly, the routing processor 301A may transmit the first request to server processor 145C in this rate-based example. In this way, any delays or "bunching up" of requests may be obviated commonly found in metric-based systems.

Referring back to FIG. 3, the routing processor 301B may receive a second request to load balance across the plurality of server processors 145. Similar to routing processor 301A, the routing processor 301B may initially select m processors to potentially send the second request, where m may represent integer greater than one. In an illustrative example where m is equal to k, and where k is two (2), the routing processor 301B may randomly select server processor 145A and server processor 145B as potential targets to transmit the second request. For the purposes of this example, the second request received by the routing processor 301B may be received at same or similar time the routing processor 301A receives the first request. Based on information received from rate controllers, as described above, the routing processor 301B may determine, similarly to the routing processor 301A, that server processor 145A has two (2) requests in its queue and that its token bucket is not "full." The routing processor 301B, however, may determine that server processor 145B, the second one randomly chosen by the routing processor 301B as a potential target, has a token bucket that is "full" even though it may have four (4) requests in its queue. According to the rate-based load balancing techniques described herein, the processor 304B may transmit the second request to server processor 145B.

It should be appreciated that in high volume traffic, where hundreds of thousands, or even millions of requests are received at the routing processors 301 and may require load balancing across the servers 140 and/or server processors 145, a rate-based approach may provide an efficient and energy-conserving way to manage incoming workload and allocate resources.

Figure 4:
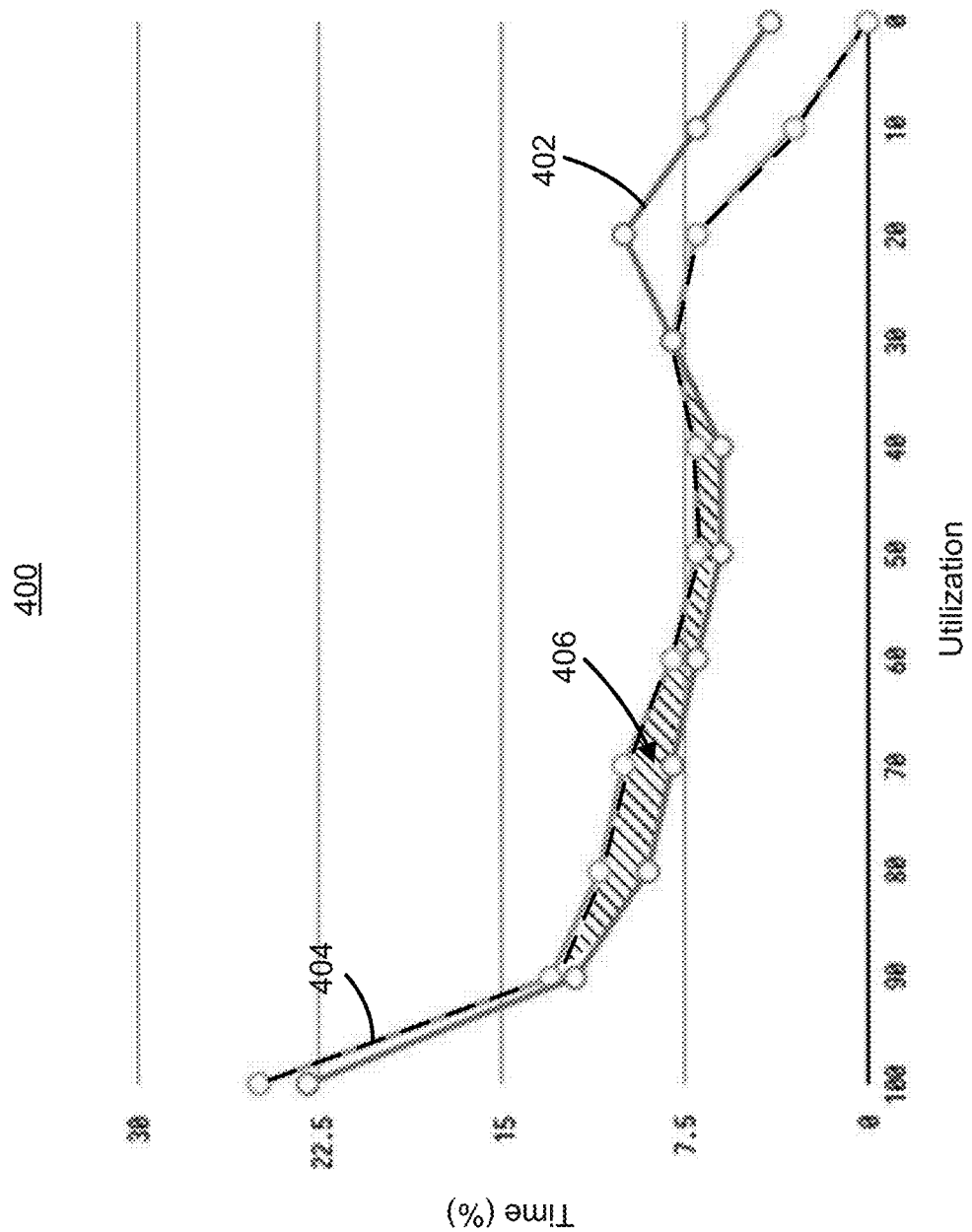
FIG. 4 illustrates a graph of processing efficiencies using rate-based load balancing, according to an example.

FIG. 4 illustrates a graph 400 depicting processing efficiencies using rate-based load balancing, according to an example. As shown in the graph 400, the x-axis may represent utilization and the y-axis may represent a fraction (or percentage) of time for any particular utilization. The graph 400 may include a line 402 that represents a metric-based approach and a line 404 that represents a rate-based approach, as described herein. It should be appreciated that the rate-based approach, as shown by line 404, may depict periods elevated levels of utilization in the middle of the graph 400, as shown by a shaded portion 406. In other words, the rate-based approach as described herein may have benefits improve on periods of low utilization typical of metric-based approaches.

Figure 5:
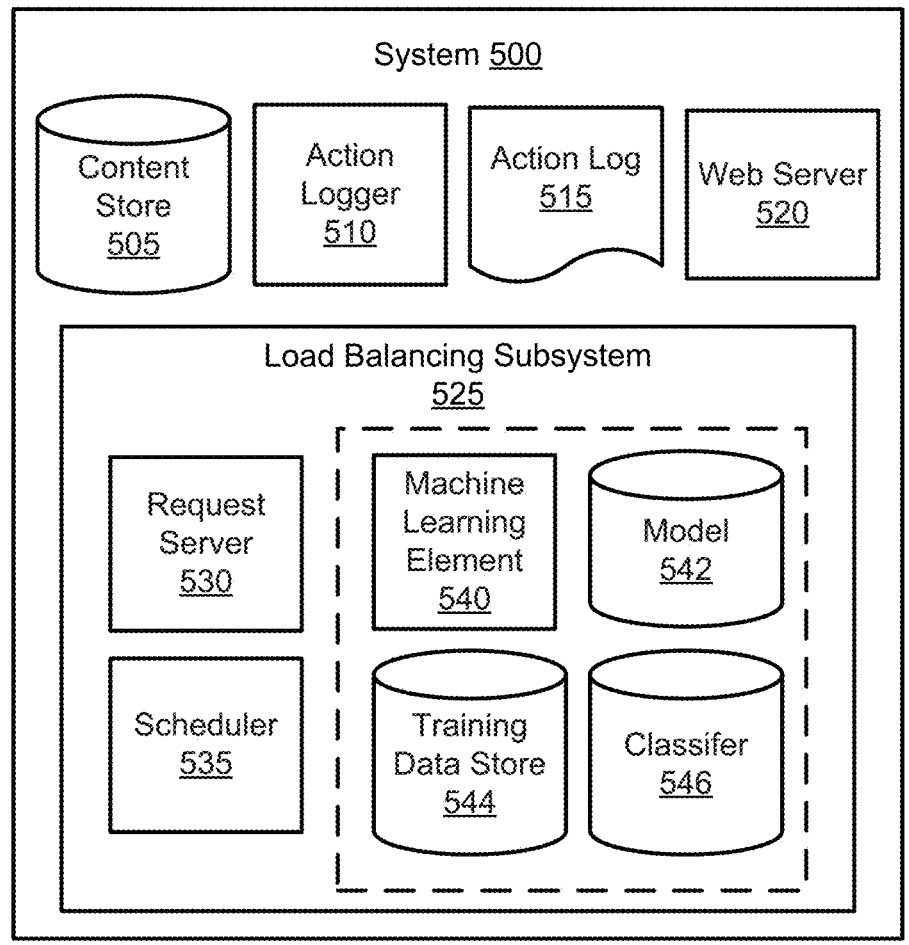
FIG. 5 illustrates a block diagram of a system 500 for rate-based load balancing with machine learning capabilities, according to an example.

FIG. 5 illustrates a block diagram of a system 500 for rate-based load balancing with machine learning capabilities, according to an example. It should be appreciated that the system 500 may be similar to the system 100 as described with respect with FIGS. 1-3, but the system 500 may be described with more specificity and with examples of additional capabilities and features. In some examples, the system 500 may be an online system having a load balancing subsystem 525 to help facilitate processing digital transactions. As shown, the system 500 may include a content store 505, an action logger 510, an action log 515, and a web server 520.

The content store 505 may store, among other things, content associated with requests. This content may include data regarding origin, source, size, type, date, time, etc. associate with any of the requests. The content store 505 may store, among other things, objects that represent various types of content. Examples of content represented by an object may include a social media post, a status update, a photo, a video, a link, a user tag event, a shared content item, a gaming application achievement, a check-in event, an advertisement, a brand page, or any other type of content. Online system users, for example, may create objects stored by the content store 505. In some examples, objects such as advertisements, may be received from third-party websites (e.g., from an external system 130 of FIG. 1) or third-party applications separate from the system 500.

The content store 505 may also store, among other things, data associated with users. This data may include user profile information directly provided by a user or inferred by the system 500. Examples of such information may include biographic, demographic, pictorial, and/or other types of descriptive information, such as employment, education, gender, hobbies, preferences, location, etc. It should be appreciated that any personal information that is acquired may be subject to various privacy settings or regulations, as described below.

The system 500 may also include the action logger 510, an action log 515, and a web server 520. In some examples, the action logger 510 may receive communications about user actions performed on or off the system 500, and may populate the action log 515 with information about various user actions. Such user actions may include, for example, adding a connection to another user or entity, sending a message from another user or entity, viewing content associated with another user or entity, initiating a payment transaction, etc. In some examples, the action logger 510 may receive, subject to one or more privacy settings or rules, content interaction activities associated with another user or entity. In addition, a number of actions described in connection with other objects may be directed at particular users, so these actions may be associated those users as well. Any or all of these user actions may be stored in the action log 515.

The system 500 may use the action log 515 to track user actions on the system 500 or other external systems. The action log 515 may also include context information associated with context of user actions. For example, such content information may include date/time an action is performed, other actions logged around the similar date/time period, or other associated actions. Other context information may include user action patterns, patterns exhibited by other similar users, or even various interactions a user may have with any particular or similar object. These and other similar actions or other similar information may be stored at the action log 515 and may be used for rate-based load balancing, as described herein.

The web server 520 may link the system 500 via a network (e.g., network 120 of FIG. 1) to one or more client devices (e.g., client devices 110 of FIG. 1). The web server 520 may serve web pages, as well as other web-related content, such as Java, Flash, XML, or other similar content. The web server 520 may communicate with various internal elements of the system 500 or external network components to provide various functionalities, such as receiving, transmitting, and/or routing content between the system 500, client devices, and other network components.

As described herein, the system 500 may also include the load balancing subsystem 525. The load balancing subsystem 525 may employ one or more rate-based load balancing techniques to help define, modify, track, schedule, execute, compare, analyze, evaluate, and/or transmit one or more requests to be load balance across any number of resources for processing. In some examples, the load balancing subsystem 525 may include a request server 530, a scheduler 535, a machine learning element 540, a model 542, a training data store 544, and a classifier 546.

The request server 530 may include any number of processors, similar to the processor 101 of system 100, as described with respect to FIGS. 1-2, that may manage incoming requests that may be processed. The request server 530 may receive incoming requests and load balance these requests across multiple resources, according to the rate-based techniques described herein. The scheduler 535 may function as rate controllers and/or receive information from rate controllers of various servers or other computing resource for processing requests to determine whether they are available to receive new requests based on the timing techniques described herein. The schedule 535 may use this information and coordinate with the request server 525 to transmit requests to available servers in an interspersed manner according to at least one rate-based load balancing approach.

The request server 530 achieve rate-based load balancing by identifying a target server to transmit any incoming request using a rate-based load balancing technique, which may involve a similar process as described with request to FIG. 3. In some examples, this may include selecting one or more servers, from a plurality of servers, as potential target(s) to receive the requests. The request server 530 may also receive, via the scheduler 535 or other timing element, a readiness indicator for the selected server. If no readiness indicator is received for any of the selected servers, the request server 530 may select one or more additional servers as potential target(s). Once a readiness indicator is received for any of the selected servers, the request server 530 may designate the selected server as the target server based on the readiness indicator and transmit the request to the target server for processing.

As described above, the readiness indicator may be based on a time technique governed by settings in a rate controller as described in FIGS. 2B-2E and FIG. 3. It should be appreciated that the predetermined time period may be configurable by a user, data associated with the request, historical data, and/or artificial intelligence (AI) based machine learning techniques.

In particular, the machine learning element 540 of the load balancing subsystem 525 may assist the request server 530 with load balance requests across multiple resources. Specifically, the machine learning element 540 may train the model 542 based on training data included in a training data store 544. The machine learning element 540 may also train a classifier 546 based on the training data. The classifier 546 may be used to assess resource capabilities, including rates of processing requests, as well as data associated with requests, including content information from content store 505. Based on these assessments, the machine learning element 540 may help the request server 530 better may identify and select a server 140 to process any particular request.

The load balancing subsystem 525 may use the machine learning element 540 to generate the model 542 and the classifier 546. The model 542 generated may provide a framework for assessing, evaluating, identifying, and selecting one or more servers 140 for processing a request. In some examples, the model 542 may include a set of weights associated with a set of features for generating an output score or value as a weighted aggregation of scores or values associated with various features. In other examples, the model 542 may include a set of weights along with instructions for aggregating weights for generation of an output score or value. In some examples, a vector or array generator (not shown) may use the model 542 to generate a vector or array that represents the characteristics of a transaction that contribute to server capabilities, especially in a rate-based load balancing regime. The machine learning element 540 may also generate a classifier 546 that takes input from the model 542, such as the vector or array generated using the model 542, to return an identification of whether the content represented by the vector may help determine which server is ready to accept a new request. In order to generate the vector or array, the training data may be provided as a matrix format. The classifier 546 generated by the machine learning element 5450 may be a single classifier or multiple classifiers, each of which may determine performance capability for each of the servers 140. These scores or values may help the machine learning element 540 analyze and determine those servers 140 with availability to accept a new request from the request server 530. It should be appreciated that the machine learning element 540 may also help refine and configure the predetermined time period for the schedule 535 and/or rate controllers 210 associated with the system 500.

The machine learning element 540 may ingest the training data from the training data store 544 to generate the model 542 and any classifier 546. The training data store 544 may include any previously analyzed content and data describing the content, such as data stored in the content store 505. In some examples, the training data may not provide data specific to a particular request, and instead may merely indicate whether or not that particular a request may be more likely to succeed or fail at a variety of servers 140 for downstream processing. The training data store 544 may include data obtained from the content store 505, action log 515, and/or other source.

The machine learning element 540 may generate the model 542 based on optimization of different types of content analysis models, including but not limited to, algorithms that analyze server capabilities to process these requests. For example, the generated model 542 may include a neural network, a tree-based model, a Bayesian network, a support vector, clustering, a kernel method, a spline, a knowledge graph, or an ensemble of one or more of these and other techniques. The machine learning element 540 may determine the weights of the model 542, e.g., the weights of edges of a neural network corresponding to the model 542. The machine learning element 540 may further generate a classifier 546 that may use such techniques. The machine learning element 540 may periodically update the model 542 and/or classifier 546 based on additional training or updated data associated with the system 500. It should be appreciated that the machine learning element 540 may vary depending on the type of input and output requirements and/or the type of task or problem intended to be solved. The machine learning element 540, as described herein, may use supervised learning or semi-supervised learning to build the model 542 using data in the training data store 544. Supervised learning may include classification and/or regression, and semi-supervised learning may include iterative optimization using objection functions to fill in gaps when at least some of the outputs are missing. It should also be appreciated that the load balancing subsystem 525 may provide other types of machine learning approaches, such as reinforcement learning, feature learning, anomaly detection, etc.

It should be appreciated that classification algorithms may provide assignment of instances to pre-defined classes to decide whether there are matches or correlations. Alternatively, clustering schemes or techniques may use groupings of related data points without labels. Use of knowledge graphs may provide an organized graph that ties nodes and edges, where a node may be related to semantic concepts, such as persons, objects, entities, events, etc., and an edge may be defined by relations between nodes based on semantics. It should be appreciated that, as described herein, the term "node" may be used interchangeably with "entity," and "edge" with "relation." Also, techniques that involve simulation models and/or decision trees may provide a detailed and flexible approach to rate-based load balancing.

It should be appreciated that the systems and subsystems shown herein, as described herein, may include one or more servers or computing devices. Each of these servers or computing devices may further include a platform and at least one application. An application may include software (e.g., machine-readable instructions) stored on a non-transitory computer readable medium and executable by a processor. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some behaviors, such as exception handling, memory management, etc., of the platform at runtime. A subsystem may be similar to a platform and may include software and hardware to run various software or applications.

While the servers, systems, subsystems, and/or other computing devices may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 500.

Figure 6:
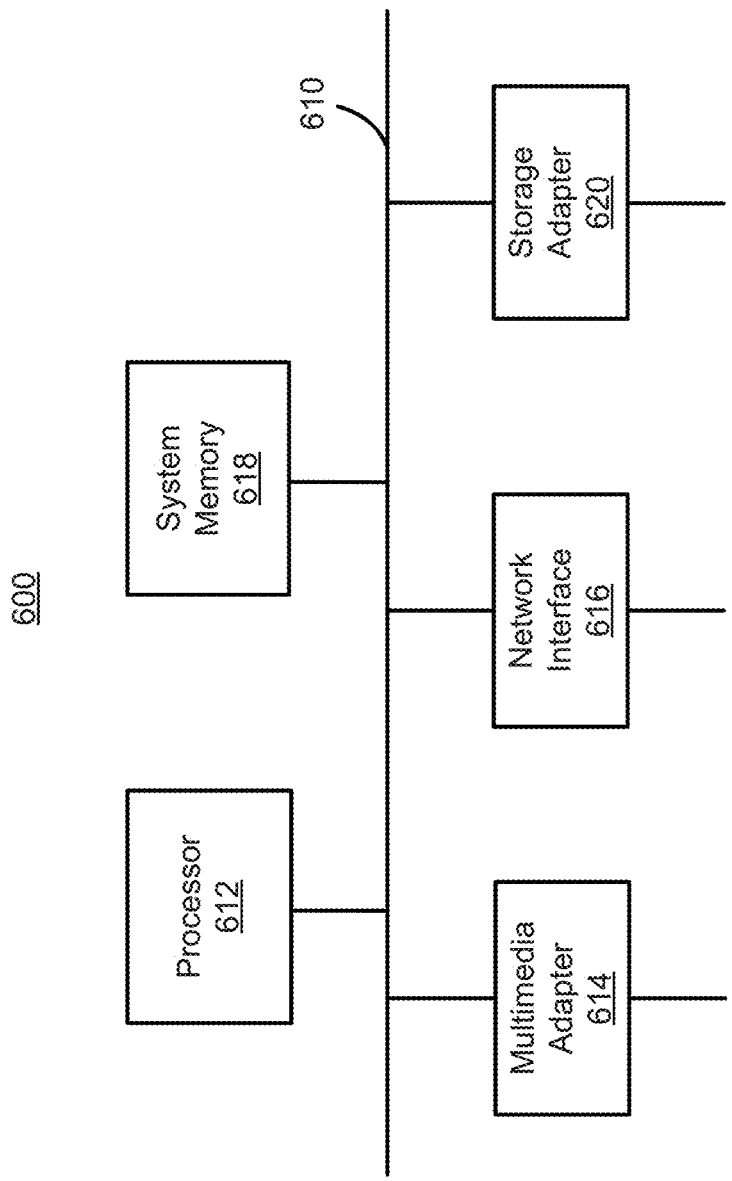
FIG. 6 illustrates a block diagram of a computer system for rate-based load balancing, according to an example.

FIG. 6 illustrates a block diagram of a computer system 600 for rate-based load balancing, according to an example. The computer system 600 may be part of or any one of the client devices 110, the external system 130, the servers 140, and/or the system 100 to perform the functions and features described herein. The computer system 600 may include, among other things, an interconnect 610, a processor 612, a multimedia adapter 614, a network interface 616, a system memory 618, and a storage adapter 620.

The interconnect 610 may interconnect various subsystems, elements, and/or components of the computer system 600. As shown, the interconnect 610 may be an abstraction that may represent any one or more separate physical buses, point-to-point connections, or both, connected by appropriate bridges, adapters, or controllers. In some examples, the interconnect 610 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 610 may allow data communication between the processor 612 and system memory 618, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 612 may be the central processing unit (CPU) of the computing device and may control overall operation of the computing device. In some examples, the processor 612 may accomplish this by executing software or firmware stored in system memory 618 or other data via the storage adapter 620. The processor 612 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 614 may connect to various multimedia elements or peripherals. These may include a devices associated with visual (e.g., video card or display), audio (e.g., sound card or speakers), and/or various input/output interfaces (e.g., mouse, keyboard, touchscreen).

The network interface 616 may provide the computing device with an ability to communicate with a variety of remove devices over a network (e.g., network 120 of FIG. 1) and may include, for example, an Ethernet adapter, a Fibre Channel adapter, and/or other wired- or wireless-enabled adapter. The network interface 616 may provide a direct or indirect connection from one network element to another, and facilitate communication and between various network elements.

The storage adapter 620 may connect to a standard computer readable medium for storage and/or retrieval of information, such as a fixed disk drive (internal or external).

Many other devices, components, elements, or subsystems (not shown) may be connected in a similar manner to the interconnect 610 or via a network (e.g., network 120 of FIG. 1). Conversely, all of the devices shown in FIG. 6 need not be present to practice the present disclosure. The devices and subsystems can be interconnected in different ways from that shown in FIG. 6. Code to implement the dynamic approaches for load balancing and processing of requests, as described herein, may be stored in computer-readable storage media such as one or more of system memory 418 or other storage. Code to implement the dynamic approaches for load balancing and processing of requests, as described herein, may also be received via one or more interfaces and stored in memory. The operating system provided on computer system 600 may be MS-DOS®, MS-WINDOWS®, OS/2®, OS X®, IOS®, ANDROID®, UNIX®, Linux®, or another operating system.

By providing a rate-based load balancing system described herein, a more reliable load balancing solution may be provided. For example, the rate-based load balancing approaches disclosed herein may increase scalability, reduce downtime, increase performance, better management resource failure, and maximize flexibility. The rate-based load balancing techniques described herein may be particularly advantageous for advertising, online shopping, or other scenarios where real-time or near real-time transaction processing may be desired.

Figure 7:
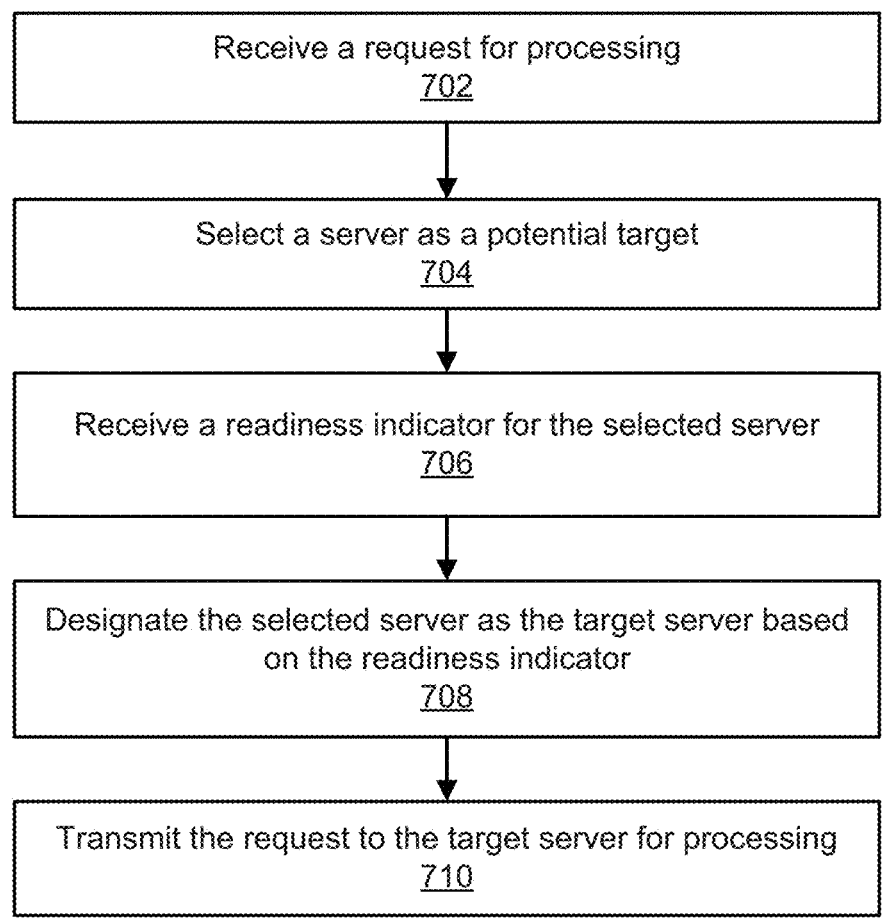
FIG. 7 illustrates a method for rate-based load balancing, according to an example.

FIG. 7 illustrates a method for rate-based load balancing, according to an example. The method 700 is provided by way of example, as there may be a variety of ways to carry out the method described herein. Although the method 700 is primarily described as being performed by systems 100, 300, or 500, the method 500 may be executed or otherwise performed by other systems, or a combination of systems. Each block shown in FIG. 7 may further represent one or more processes, methods, or subroutines, and one or more of the blocks may include machine-readable instructions stored on a non-transitory computer readable medium and executed by a processor or other type of processing circuit to perform one or more operations described herein.

At 702, the processor 101 may receive a request for processing. As described herein, the request may be any type of data or network traffic that may require processing. This may include, for example, a request for an electronic or online transaction, a payment transaction, an advertisement transaction, etc.

In order to identify a target server to transmit the request using a rate-based load balancing technique, the processor 101, at 704 may select at least one server, from a plurality of servers, as a potential target. In some examples, this may include selecting two or three servers, as described above.

When at least one server is selected as a potential target, the processor 101, at 706, may receive a readiness indicator for the selected server. If no readiness indicator is received for any of the selected servers, the processor may repeat 704 and reselect at least one server, from a plurality of servers, as a potential target.

When a readiness indicator is received for any of the selected servers, the processor 101, at 708, may designate any of these selected servers as the target server based on the readiness indicator. As described herein, the readiness indicator may be based on a timing technique that involves a rate controller 210 or other scheduling technique or timing factor. The rate controller 210 may provide the readiness indicator once a predetermined time period has passed. As mentioned above, the predetermined time period may be configured in any number of ways, including, but not limited to, by a user, using data associated with at least the request or the plurality of servers, an artificial intelligence (AI) based machine learning technique, and/or any other setting. In some examples, the rate controller 210 may use a token bucket to provide the timing technique.

At 710, the processor 101 may transmit the request to the target server for processing, as described with respect to FIGS. 1-3 and 5.

Although the selection and routing methods and systems as described herein may be directed mainly to load balancing requests, it should be appreciated that the systems and methods described herein may also provide management of data and workflow. For example, the systems and methods described herein may also be used in various computing environments, such as in advertisement, social media, telecommunications, retail, manufacturing, user-to-user interaction, financial transactions, and/or any other digital communication that involves transmission of data and workflow. Other applications or uses of the systems and methods described herein may also include competitive marketing, performance analysis, risk analysis, data management, content-based recommendation engines, and/or other types of knowledge or data-driven systems.

It should be noted that the functionality described herein may be subject to one or more privacy policies, described below, enforced by the systems and methods described herein that may bar use of images for concept detection, recommendation, generation, and analysis.

In particular examples, one or more objects (e.g., content or other types of objects) of a computing system may be associated with one or more privacy settings. The one or more objects may be stored on or otherwise associated with any suitable computing system or application, such as, for example, the system 100, the client devices 110, servers 140, the external system 130, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the system 100 or shared with other systems (e.g., an external system 130). Although this disclosure describes using particular privacy settings in a particular manner, this disclosure contemplates using any suitable privacy settings in any suitable manner.

In particular examples, the system 100 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the system 100 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the system 100 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the system 100 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The system 100 may access such information in order to provide a particular function or service to the first user, without the system 100 having access to that information for any other purposes. Before accessing, storing, or using such objects or information, the system 100 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the system 100.

In particular examples, a user may specify whether particular types of objects or information associated with the first user may be accessed, stored, or used by the system 100. As an example and not by way of limitation, the first user may specify that images sent by the first user through the system 100 may not be stored by the system 100. As another example and not by way of limitation, a first user may specify that messages sent from the first user to a particular second user may not be stored by the system 100. As yet another example and not by way of limitation, a first user may specify that all objects sent via a particular application may be saved by the system 100.

In particular examples, privacy settings may allow a first user to specify whether particular objects or information associated with the first user may be accessed from client devices 110 or external systems 130. The privacy settings may allow the first user to opt in or opt out of having objects or information accessed from a particular device (e.g., the phone book on a user's smart phone), from a particular application (e.g., a messaging app), or from a particular system (e.g., an email server). The system 100 may provide default privacy settings with respect to each device, system, or application, and/or the first user may be prompted to specify a particular privacy setting for each context. As an example and not by way of limitation, the first user may utilize a location-services feature of the system 100 to provide recommendations for restaurants or other places in proximity to the user. The first user's default privacy settings may specify that the system 100 may use location information provided from one of the client devices 110 of the first user to provide the location-based services, but that the system 100 may not store the location information of the first user or provide it to any external system 130. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The system 100 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the system 100 may use a user's previous activities and calculated moods, emotions, or sentiments to determine a present mood, emotion, or sentiment. A user who wishes to enable this functionality may indicate in their privacy settings that they opt in to the system 100 receiving the inputs necessary to determine the mood, emotion, or sentiment. As an example and not by way of limitation, the system 100 may determine that a default privacy setting is to not receive any information necessary for determining mood, emotion, or sentiment until there is an express indication from a user that the system 100 may do so. By contrast, if a user does not opt in to the system 100 receiving these inputs (or affirmatively opts out of the system 100 receiving these inputs), the system 100 may be prevented from receiving, collecting, logging, or storing these inputs or any information associated with these inputs. In particular examples, the system 100 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the system 100 may use the user's mood, emotion, or sentiment to provide newsfeed items, pages, friends, or advertisements to a user. The user may specify in their privacy settings that the system 100 may determine the user's mood, emotion, or sentiment. The user may then be asked to provide additional privacy settings to indicate the purposes for which the user's mood, emotion, or sentiment may be used. The user may indicate that the system 100 may use his or her mood, emotion, or sentiment to provide newsfeed content and recommend pages, but not for recommending friends or advertisements. The system 100 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the system 100 may be restricted in its access, storage, or use of the objects or information. The system 100 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the system 100 may temporarily store the message in a content data store until the second user has viewed or downloaded the message, at which point the system 100 may delete the message from the data store. As another example and not by way of limitation, continuing with the prior example, the message may be stored for a specified period of time (e.g., 2 weeks), after which point the system 100 may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the system 100 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the system 100. The user's privacy settings may specify that such information may be used only for particular processes, such as authentication, and further specify that such information may not be shared with any external system 130 or used for other processes or applications associated with the system 100. As another example and not by way of limitation, the system 100 may provide a functionality for a user to provide voice-print recordings to the online social network. As an example and not byway of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system 130 or used by other processes or applications associated with the system 100. As another example and not by way of limitation, the system 100 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system 130 or used by other processes or applications associated with the system 100.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The system 100 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the system 100 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the system 100 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the system 100 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the system 100 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the system 100 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the system 100 may send a reminder to the user to confirm his or her privacy settings every six months or after every ten photo posts. In particular examples, privacy settings may also allow users to control access to the objects or information on a per-request basis. As an example and not by way of limitation, the system 100 may notify the user whenever an external system 130 attempts to access information associated with the user, and require the user to provide verification that access should be allowed before proceeding.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
a processor; and
a memory storing instructions, which when executed by the processor, cause the processor to:
receive a request for processing;
identify a target server to transmit the request using a rate-based load balancing technique by:
selecting a server, from a plurality of servers, as a potential target;
receiving a readiness indicator for the selected server, wherein the readiness indicator is based on a timing technique using a fixed-capacity token bucket, wherein the fixed-capacity token bucket is based at least in part on an algorithmic sequence, wherein the algorithmic sequence is based on a classification algorithm to provide assignment of instances to pre-defined classes to decide whether there are matches or correlation and into which one or more tokens, each comprising a packet of predetermined size, are added into the fixed-capacity token bucket at a predetermined fixed rate of 1/r seconds, where r is an integer, such that, in the event a token arrives when the fixed-capacity token bucket is full, the token is discarded and the fixed-capacity token bucket remains full until the selected server is designated as the target server based on the readiness indicator; and
designating the selected server as the target server based on the readiness indicator; and
transmit the request to the target server for processing.

2. The system of claim 1, wherein the timing technique measures and identifies whether a predetermined time period has passed.

3. The system of claim 2, wherein a rate controller associated with the selected server generates the readiness indicator based on the timing technique, wherein the readiness indicator is a digital transmission that indicates whether the selected server is able to process the request.

4. The system of claim 3, wherein the rate controller provides the readiness indicator upon selection of the server, by the processor, as the potential target or following passage of the predetermined time period.

5. The system of claim 4, wherein the predetermined time period is configured by a user.

6. The system of claim 4, wherein the predetermined time period is configured based on data associated with at least the request or the plurality of servers.

7. The system of claim 4, wherein the predetermined time period is configured by using an artificial intelligence (AI) based machine learning technique based on information associated with the request or the selected server, wherein the artificial intelligence (AI) based machine learning technique utilizes at least one of a neural network, a tree-based model, a Bayesian network, a support vector, clustering, a kernel method, a spline, or a knowledge graph.

8. The system of claim 1, wherein the system is an online system for processing digital requests associated with at least one of advertisements, payments, or social media.

9. A method, comprising:
receiving, by a processor of a rate-based load balancing system operating in a network, a request for processing;
selecting, by the processor, a resource, from a plurality of resources, as a potential target resource;
receiving, by the processor, a readiness indicator for the selected resource, wherein the readiness indicator is based on a timing technique using a fixed-capacity token bucket, wherein the fixed-capacity token bucket is based at least in part on an algorithmic sequence, wherein the algorithmic sequence is based on a classification algorithm to provide assignment of instances to pre-defined classes to decide whether there are matches or correlation and into which one or more tokens, each comprising a packet of predetermined size, are added into the fixed-capacity token bucket at a predetermined fixed rate of 1/r seconds, where r is an integer, such that, in the event a token arrives when the fixed-capacity token bucket is full, the token is discarded and the fixed-capacity token bucket remains full until the selected server is designated as the target server based on the readiness indicator; and
designating, by the processor, the selected resource as a target resource based on the readiness indicator; and
transmitting, by the processor, the request to the target resource for processing.

10. The method of claim 9, wherein the timing technique measures and identifies whether a predetermined time period has passed.

11. The method of claim 10, wherein a rate controller associated with the selected resource generates the readiness indicator based on the timing technique, wherein the readiness indicator is a digital transmission that indicates whether the selected resource is able to process the request.

12. The method of claim 11, wherein the rate controller provides the readiness indicator upon selection of the resource, by the processor, as the potential target or following termination of a predetermined time period.

13. The method of claim 12, wherein the predetermined time period is configured by a user.

14. The method of claim 12, wherein the predetermined time period is configured based on data associated with at least the request or the plurality of resources.

15. The method of claim 12, wherein the predetermined time period is configured by using an artificial intelligence (AI) based machine learning technique based on information associated with the request or the selected resource, wherein the artificial intelligence (AI) based machine learning technique utilizes at least one of a neural network, a tree-based model, a Bayesian network, a support vector, clustering, a kernel method, a spline, or a knowledge graph.

16. The method of claim 9, wherein the rate-based load balancing system is an online system for processing digital requests associated with at least one of advertisements, payments, or social media.

17. A non-transitory computer-readable storage medium having an executable stored thereon, which when executed instructs a processor to:
receive a request for processing;
identify a target resource to transmit the request using a rate-based load balancing technique, wherein to identify the target resource using the rate-based load balancing technique, the processor is to:
select a resource, from a plurality resources, as a potential target resource;
receive a readiness indicator for the selected resource, wherein the readiness indicator is based on a timing technique using a fixed-capacity token bucket, wherein the fixed-capacity token bucket is based at least in part on an algorithmic sequence, wherein the algorithmic sequence is based on a classification algorithm to provide assignment of instances to pre-defined classes to decide whether there are matches or correlation and into which one or more tokens, each comprising a packet of predetermined size, are added into the fixed-capacity token bucket at a predetermined fixed rate of 1/r seconds, where r is an integer, such that, in the event a token arrives when the fixed-capacity token bucket is full, the token is discarded and the fixed-capacity token bucket remains full until the selected server is designated as the target server based on the readiness indicator; an
designate the selected resource as the target resource based on the readiness indicator; and
transmit the request to the target resource.

18. The non-transitory computer-readable storage medium of claim 17, wherein the readiness indicator is provided by a rate controller associated with the selected resource following passage of a predetermined time period.

* * * * *